(12) United States Patent
Wright et al.

(10) Patent No.: US 11,935,140 B2
(45) Date of Patent: Mar. 19, 2024

(54) INITIATING COMMUNICATION BETWEEN FIRST AND SECOND USERS

(71) Applicant: Nokia Technologies Oy, Espoo (FI)

(72) Inventors: Christopher Wright, London (GB); Matthew Lawrenson, Chesterfield, MO (US); David Duffy, Cambridge (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 182 days.

(21) Appl. No.: 17/021,350

(22) Filed: Sep. 15, 2020

(65) Prior Publication Data

US 2021/0097629 A1 Apr. 1, 2021

(30) Foreign Application Priority Data

Sep. 26, 2019 (EP) ..................................... 19199874

(51) Int. Cl.
*G06Q 50/00* (2012.01)
*G06F 3/01* (2006.01)
*H04L 51/52* (2022.01)
*H04L 67/306* (2022.01)

(52) U.S. Cl.
CPC ............. *G06Q 50/01* (2013.01); *G06F 3/013* (2013.01); *H04L 67/306* (2013.01); *H04L 51/52* (2022.05)

(58) Field of Classification Search
None
See application file for complete search history.

(56) References Cited

U.S. PATENT DOCUMENTS

| | | | |
|---|---|---|---|
| 8,602,789 B2 | 12/2013 | Hallowell et al. | |
| 8,814,359 B1 | 8/2014 | Pompilio, III et al. | |
| 10,223,642 B1* | 3/2019 | Felder | G06N 7/01 |
| 10,685,488 B1* | 6/2020 | Kumar | A61H 23/04 |
| 10,701,426 B1* | 6/2020 | van Hoff | G06Q 30/0261 |
| 2011/0256520 A1* | 10/2011 | Siefert | G06V 40/70 |
| | | | 434/322 |

(Continued)

OTHER PUBLICATIONS

Loftus, "Eye Fixations and Recognition Memory for Pictures", Cognitive Psychology, vol. 3, No. 4, 1972, pp. 525-551.

(Continued)

*Primary Examiner* — Andrew B Whitaker
(74) *Attorney, Agent, or Firm* — SQUIRE PATTON BOGGS (US) LLP

(57) ABSTRACT

An apparatus comprising means for: rendering first content to a first user, the first content being based on recorded content associated with a second user; eye tracking in a time interval following the rendering of the first content to obtain eye-tracking data of the first user; determining first data indicative of whether or not there is a match between the eye-tracking data of the first user and reference eye-tracking data associated with the recorded content associated with the second user; receiving second data indicative of whether or not there is a match between eye-tracking data of the second user and reference eye-tracking data associated with recorded content associated with the first user; and if both the first and second data are indicative of a match, then providing the first user with a telecommunication option configured to initiate communication with the second user.

19 Claims, 6 Drawing Sheets

(56) References Cited

U.S. PATENT DOCUMENTS

| | | | |
|---|---|---|---|
| 2012/0094700 A1* | 4/2012 | Karmarkar | G06F 3/04842 455/466 |
| 2012/0102431 A1 | 4/2012 | Krolczyk et al. | |
| 2014/0049462 A1* | 2/2014 | Weinberger | G06F 3/013 345/156 |
| 2014/0108530 A1* | 4/2014 | Papakipos | G06Q 50/01 709/204 |
| 2016/0015307 A1* | 1/2016 | Kothuri | G06Q 30/02 702/19 |
| 2016/0042648 A1* | 2/2016 | Kothuri | G06V 40/166 434/236 |
| 2016/0187972 A1* | 6/2016 | Biswas | G01C 21/36 345/156 |
| 2016/0378861 A1* | 12/2016 | Eledath | G06V 20/52 707/766 |
| 2017/0076000 A1* | 3/2017 | Ashoori | G06Q 10/06 |
| 2018/0196783 A1* | 7/2018 | Dey | G06F 3/013 |
| 2018/0314881 A1* | 11/2018 | Sud | G06F 3/013 |
| 2019/0265789 A1* | 8/2019 | von undzu Liechtenstein | G06F 16/9536 |

OTHER PUBLICATIONS

"7 Apps you've probably never heard of to keep in touch with friends and family back home", Transferwise, Retrieved on Sep. 15, 2020, Webpage available at : https://transferwise.com/GB/blog/apps-to-keep-in-touch-overseas.

"6 Apps to Help You Stay in Touch with Friends", Paintnite, Retrieved on Dec. 27, 2018, Webpage available at : https://www.paintnite.com/blog/apps-keep-in-touch-friends/.

"Can't get an image out of your head? Your eyes are helping to keep it there", Medical Xpress, Retrieved on Sep. 15, 2020, Webpage available at : https://medicalxpress.com/news/2018-02-image-eyes.html.

Johansson et al., "Look Here, Eye Movements Play a Functional Role in Memory Retrieval", Psychological Science, Oct. 28, 2013, pp. 1-7.

Pathman et al., "Eye Movements Provide an Index of Veridical Memory for Temporal Order", Plos One, May 20, 2015, pp. 1-17.

Raudonis et al., "Evaluation of Human Emotion from Eye Motions", International Journal of Advanced Computer Science and Applications, vol. 4, No. 8, 2013, pp. 79-84.

"How involuntary micro expressions can reveal your true emotions", Business Insider, Retrieved on Sep. 15, 2020, Webpage available at : https://www.businessinsider.com/how-involuntary-micro-expressions-can-reveal-your-true-emotions-2015-2?r=UK&IR=T.

"Friendship by the Numbers", Psychology Today, Retrieved on Sep. 15, 2020, Webpage available at : https://www.psychologytoday.com/US/blog/once-more-feeling/201712/friendship-the-numbers.

Roberts et al., "Managing Relationship Decay Network, Gender, and Contextual Effects", Human Nature, vol. 26, No. 4, 2015, pp. 426-450.

"A new app called Garden helps you stay in touch with friends and family without Facebook", Tech Crunch, Retrieved on Sep. 15, 2020, Webpage available at : https://techcrunch.com/2018/04/10/a-new-app-called-garden-helps-you-stay-in-touch-with-friends-and-family-without-facebook/.

"Be a better friend", Tinyblu, Retrieved on Sep. 15, 2020, Webpage available at : https://tinyblu.com/.

"7 Surprising Ways Anxiety Impacts Friendships", The Mighty, Retrieved on Sep. 15, 2020, Webpage available at : https://themighty.com/2018/09/anxiety-friendship-impact/.

Xiang et al., "Modeling Relationship Strength in Online Social Networks", Proceedings of the 19th international conference on World wide, Apr. 2010, pp. 981-990.

Extended European Search Report received for corresponding European Patent Application No. 19199874.9, dated Mar. 20, 2020, 6 pages.

Hickson et al., "Eyemotion: Classifying facial expressions in VR using eye-tracking cameras", arXiv, Jul. 22, 2017, pp. 1-10.

* cited by examiner

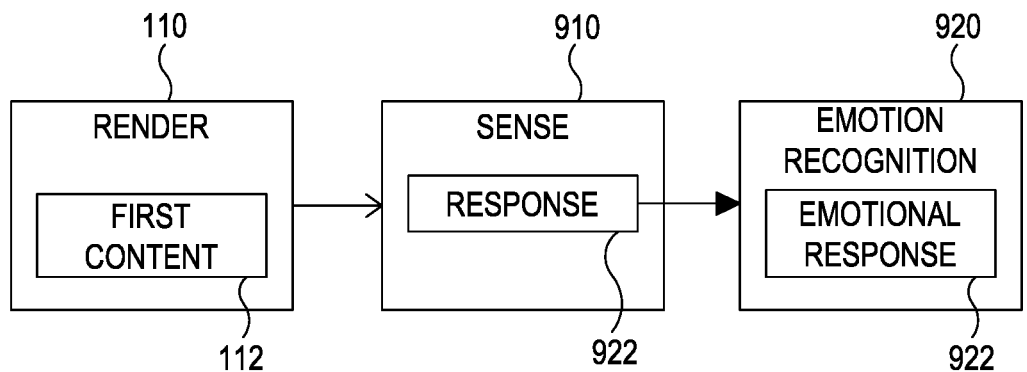
FIG. 9
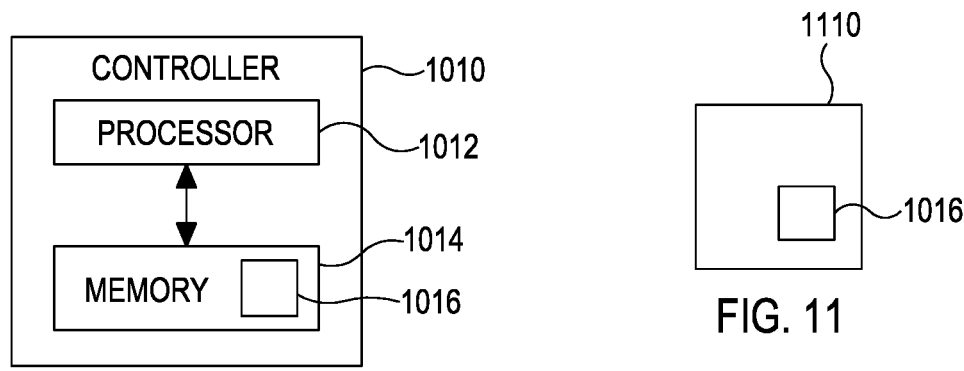
FIG. 10
FIG. 11
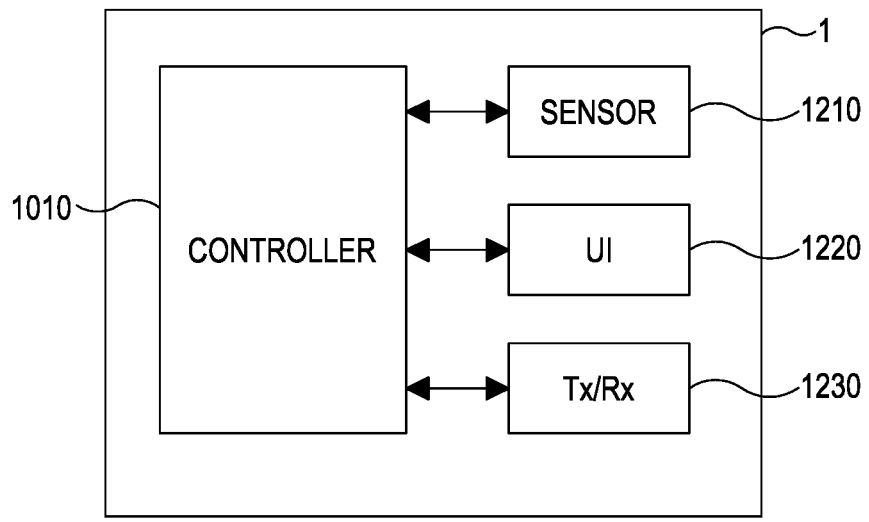
FIG. 12

INITIATING COMMUNICATION BETWEEN FIRST AND SECOND USERS

TECHNOLOGICAL FIELD

Embodiments of the present disclosure relate to initiating communication between first and second users. Some relate to initiating communication between first and second users based on eye-tracking data of each user following the rendering of respective content to each user.

BACKGROUND

A decline in the frequency of communication between a user and their contacts can occur unintentionally. It can be challenging to increase the frequency of communication between a user and one of their contacts once the decline has begun. It is known to provide a user with content associated with one of their contacts on dates which have a shared significance to both the user and their contact.

BRIEF SUMMARY

According to various, but not necessarily all, embodiments there is provided an apparatus comprising means for: rendering first content to a first user, the first content being based on recorded content associated with a second user; eye tracking in a time interval following the rendering of the first content to obtain eye-tracking data of the first user; determining first data indicative of whether or not there is a match between the eye-tracking data of the first user and reference eye-tracking data associated with the recorded content associated with the second user; receiving second data indicative of whether or not there is a match between eye-tracking data of the second user and reference eye-tracking data associated with recorded content associated with the first user; and if both the first and second data are indicative of a match, then providing the first user with a telecommunication option configured to initiate communication with the second user.

According to various, but not necessarily all, embodiments there is provided a system comprising means for: rendering first content to a first user, the first content being based on recorded content associated with a second user; rendering second content to the second user, the second content being based on recorded content associated with the first user; eye tracking in a time interval following the rendering of the first content to obtain eye-tracking data of the first user; eye tracking in a time interval following the rendering of the second content to obtain eye-tracking data of the second user; determining first data indicative of whether or not there is a match between the eye-tracking data of the first user and reference eye-tracking data associated with the recorded content associated with the second user; determining second data indicative of whether or not there is a match between the eye-tracking data of the second user and reference eye-tracking data associated with the recorded content associated with the first user; and if both the first and second data are indicative of a match, then providing the first user with a telecommunication option configured to initiate communication with the second user.

According to various, but not necessarily all, embodiments there is provided a method comprising: rendering first content to a first user, the first content being based on recorded content associated with a second user; eye tracking in a time interval following the rendering of the first content to obtain eye-tracking data of the first user; determining first data indicative of whether or not there is a match between the eye-tracking data of the first user and reference eye-tracking data associated with the recorded content associated with the second user; receiving second data indicative of whether or not there is a match between eye-tracking data of the second user and reference eye-tracking data associated with recorded content associated with the first user; and if both the first and second data are indicative of a match, then providing the first user with a telecommunication option configured to initiate communication with the second user.

According to various, but not necessarily all, embodiments there is provided a computer program that, when run on a computer, performs: causing rendering of first content to a first user, the first content being based on recorded content associated with a second user; causing eye tracking in a time interval following the rendering of the first content to obtain eye-tracking data of the first user; determining first data indicative of whether or not there is a match between the eye-tracking data of the first user and reference eye-tracking data associated with the recorded content associated with the second user; receiving second data indicative of whether or not there is a match between eye-tracking data of the second user and reference eye-tracking data associated with recorded content associated with the first user; and if both the first and second data are indicative of a match, then causing the first user to be provided with a telecommunication option configured to initiate communication with the second user.

The following portion of this 'Brief Summary' section, describes various features that may be features of any of the embodiments described in the foregoing portion of the 'Brief Summary' section. The description of a function should additionally be considered to also disclose any means suitable for performing that function.

If the first data is not indicative of a match and second data is indicative of a match, then third content can be rendered to the first user, the third content being based on further recorded content associated with the second user.

The recorded content associated with the second user can be the same as the recorded content associated with the first user.

Recorded content associated with the second user can comprise visual content.

The first content can be rendered to the first user in response to determining that a frequency of communication between the first and second users is below a threshold frequency.

The rendering of the first content to the first user can be conditional on a classification of a monitored behavior of the first user.

The first content can be rendered to the first user in response to receiving second data which indicates a match between the eye-tracking data of the second user and the reference eye-tracking data associated with the recorded content associated with the first user.

The time interval can begin immediately following the rendering of the first content.

The reference eye-tracking data associated with the recorded content associated with the second user can be based on eye-tracking data recorded while the first user viewed the recorded content associated with the second user at an earlier time.

The reference eye-tracking data associated with the recorded content associated with the second user can be based on eye-tracking data of the second user in respect of the recorded content associated with the second user The first data can indicate a match when a similarity measure between the eye-tracking data of the first user and reference eye-tracking data associated with the recorded content associated with the second user exceeds a threshold value.

Communication can be initiated between the first user and the second user upon actuation of the telecommunication option by the first user.

One or more content features can be determined based on fixation durations at fixation points at which the eye-tracking data of the first user matches the reference eye-tracking data associated with the recorded content associated with the second user. The first user can be provided with feedback based on the determined one or more content features.

The eye-tracking data of the first user can be compared with the eye-tracking data of the second user to determine one or more fixation points at which the eye-tracking data of the first user matches the eye-tracking data of the second user. One or more content features can be determined based on the one or more fixation points at which the eye-tracking data of the first user matches the eye-tracking data of the second user. The first user can be provided with feedback based on the determined one or more content features.

A polarity of an emotional response of the first user to the first content can be determined based on analysis of facial movements and/or physiological parameters, wherein the provision of the telecommunication option can be conditional on the polarity of the emotional response of the first user to the first content being positive.

According to various, but not necessarily all, embodiments there is provided examples as claimed in the appended claims.

BRIEF DESCRIPTION

Some examples will now be described with reference to the accompanying drawings in which:

FIG. 1 illustrates an example of a method described herein;

FIGS. 2A to C illustrate examples of distributions of method blocks;

FIG. 9 illustrates an example of a method described herein;

FIG. 10 illustrates an example of a controller described herein;

FIG. 11 illustrates an example of a delivery mechanism described herein; and

FIG. 12 illustrates an example of an apparatus described herein.

DETAILED DESCRIPTION

Figure 1:
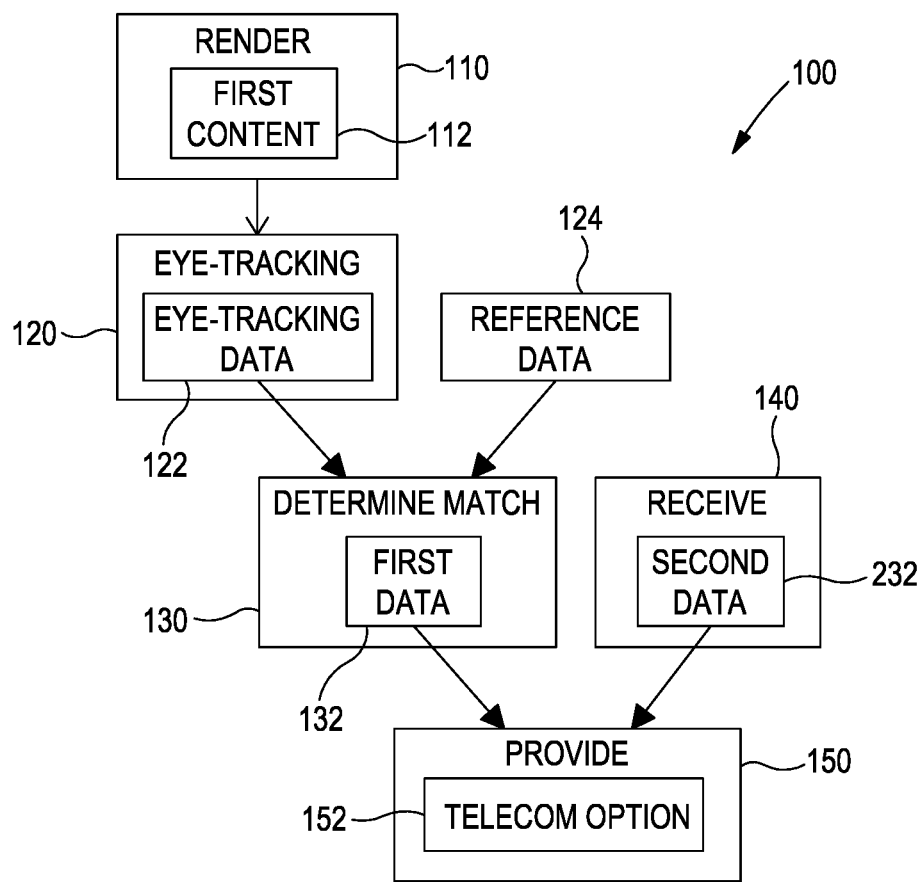

FIG. 1 illustrates an example of a method 100 that enables the establishment of communication between two users.

Figure 2A:
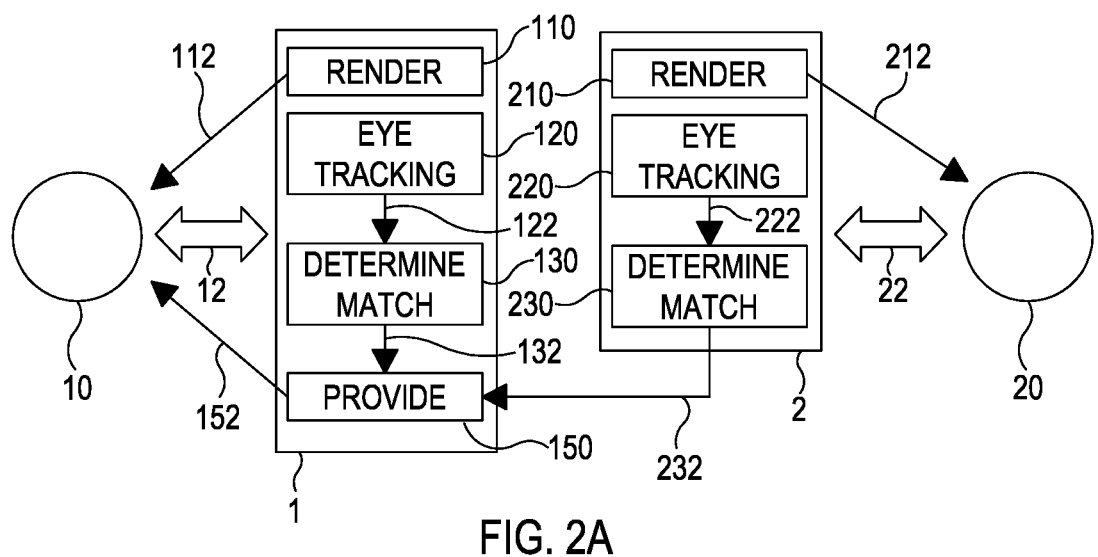
Figure 3A:
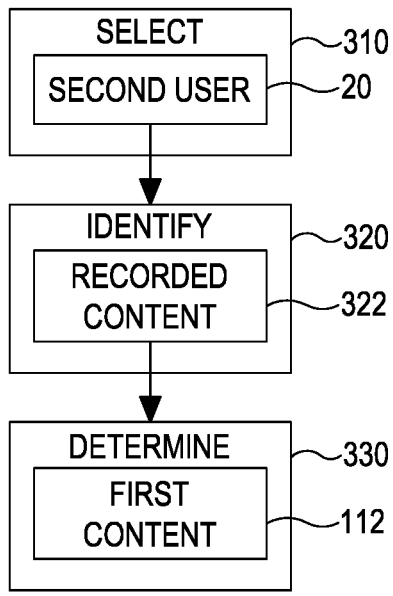
FIGS. 3A and 3B illustrate examples of a method described herein.

At block 110, the method 100 comprises rendering first content 112 to a first user 10 (as shown in FIG. 2A). The first content 112 is based on recorded content 322 associated with the second user 20 (as shown in FIG. 3A). In some examples the first content 112 is a reminder or trigger for recalling or visualizing the recorded content 322 associated with the second user 20. Thus, the rendering of the first content 112 to the first user 10 can have the effect of priming the first user 10 for communication with the second user 20.

"Rendering" content means putting the content into a form by which the content is perceptible by a user who is a human.

At block 120 the method 100 comprises eye tracking. The eye tracking is performed during the time interval following the rendering of the first content 112 to the first user 10 (as per block 110) to obtain eye-tracking data 112 of the first user 10.

"Following the rendering" of content means after the content has been put into a form by which the content is perceptible by a user who is a human. It may not mean after the content is no longer provided to the user in a form which is perceptible by them.

Figure 7:
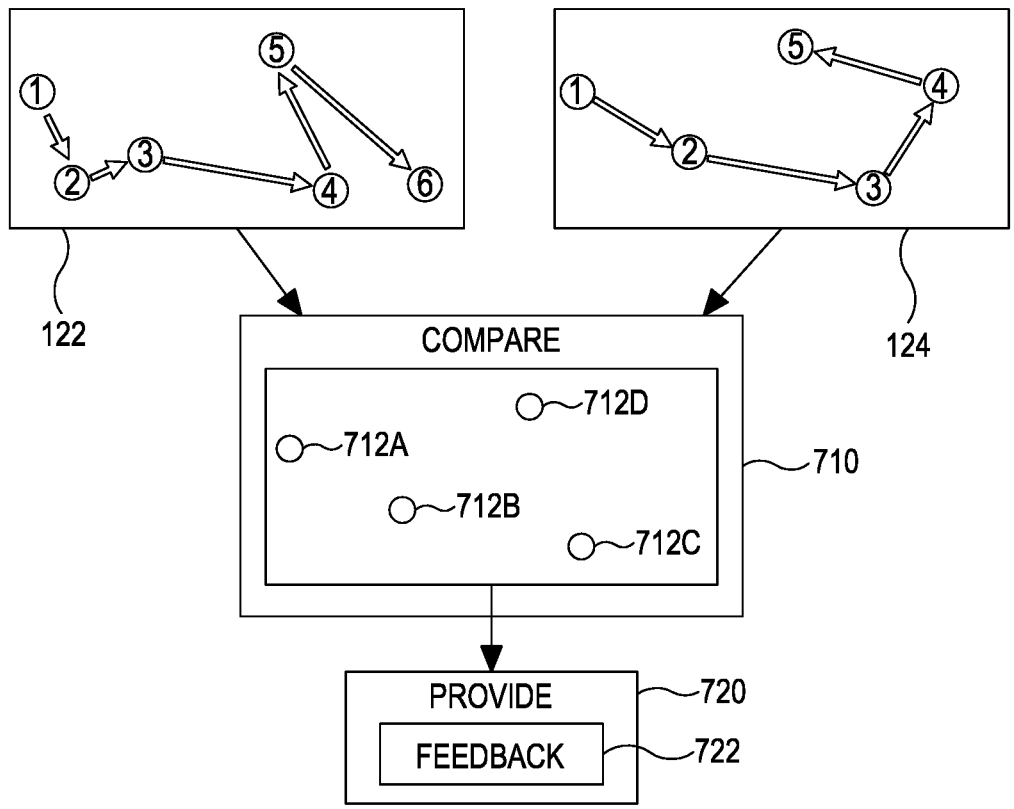
FIG. 7 illustrates an example of providing feedback.

Spontaneous eye movements occur when users recall or visualize a scene from memory. The spontaneous eye movements on recall or visualization of the scene are related to the eye movements made by the user in respect of the original scene. Thus, the spontaneous eye movement upon recall or visualization are related to salient features of the original scene for the user. By performing eye tracking in the time interval following the rendering of the first content 112 to the first user 10, the obtained eye-tracking data 122 may be indicative of recall or visualization of the recorded content 322 associated with the second user 20 and may further be indicative of content features 712A-D (as shown in FIG. 7) which may have high salience within the recorded content 322 associated with the second user 20.

In some examples the time interval for obtaining the eye-tracking data 122 begins immediately following the rendering of the first content 112.

The time interval for obtaining the eye-tracking data 122 can have a duration in the range of 5 to 12 seconds. In other examples, the eye tracking is performed over a longer time interval and the method 100 comprises identifying eye movements indicative of a recall event from patterns within that time interval. Those eye movements identified as being indicative of a recall event may form the eye-tracking data 122 of the first user 10 which is fed forward to block 130 of the method 100.

At block 130, the method 100 comprises determining first data 132 indicative of whether or not there is a match between the eye-tracking data 122 of the first user 10 and reference eye-tracking data 124 associated with the recorded content 322 associated with the second user 20.

The reference eye-tracking data 124 may represent a spatial distribution of well-defined features of the recorded content 322 or a path between at least some of said features which is indicative of an expected pattern of eye movement when viewing the recorded content 322. Thus, the first data 132, in indicating whether or not there is a match between the eye-tracking data 122 of the first user 10 and the reference eye-tracking data 124, may represent the success or failure of the first user 10 to recall the recorded content 322 associated with the second user 20, having been prompted to recall the recorded content 322 by the rendering of the first content 112 (as per block 110). Thus, block 130 can represent a test to confirm whether the first user 10 is primed for communication with the second user 20.

The duration of the first user's spontaneous eye movements as induced by recall or visualisation of the recorded content 322 can be linked to eye movements made during encoding a memory of the recorded content 322 by a user (for example, the first user 10). These eye movements made during encoding can, in some examples, be recorded in the reference eye-tracking data 124. Thus, the time interval for obtaining the eye-tracking data 122 can have a duration dependent on the reference eye-tracking data 124.

Figure 3B:
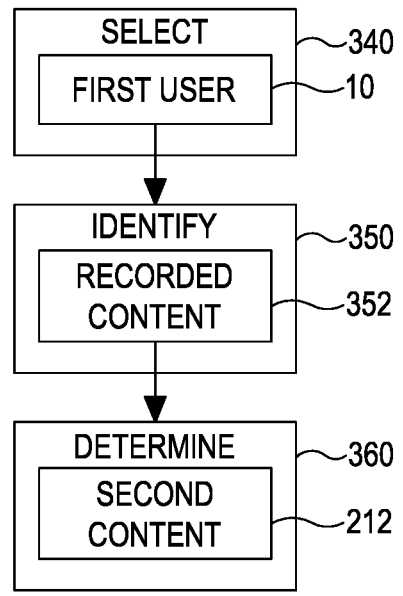

At block 140, the method 100 comprises receiving second data 232 indicative of whether or not there is a match between eye-tracking data 222 (as shown in FIG. 2A) of the second user 20 and reference eye-tracking data 224 (as shown in FIG. 2A) associated with recorded content 352 (as shown in FIG. 3B) associated with the first user 10. For example, equivalent blocks as 110 to 130 may have been performed in respect of the second user 20 to determine the success or failure of the second user 20 to recall recorded content 352 associated with the first user 10.

In some examples the recorded content 322 associated with the second user 20 is the same as the recorded content 352 associated with the first user 10. That is, the recorded content 322 is associated with both the first and second users 10, 20. Thus, if both the first and second data 132, 232 are indicative of a match the first and second users 10, 20 may be recalling the same scene.

At block 150, the method comprises providing the first user 10 with a telecommunication option 152. The telecommunication option 152 is configured to initiate communication with the second user 20. The telecommunication option 152 is provided to the first user 10 if both the first and second data 132, 232 are indicative of a match.

The telecommunication option 152 comprises a control user interface or a control user interface element which, upon actuation, causes the transmission of signals, messages or other information via a telecommunication network. The telecommunication option 152 is actuatable by the first user 10. The telecommunication option 152 in this example causes the transmission of signals, messages, or other information to a known address of the second user 20 within the telecommunication network, upon actuation by the first user 10.

Thus, the provision of this telecommunication option 152 to the first user 10 if the first and second data 132, 232 are indicative of a match (for example, if the first and second user 10, 20 are found to recall recorded content 322, 352 respectively associated with one another) directly and automatically provides the first user 10 with appropriate control options for communicating with the second user 20 at a time when both the first user 10 and second user 20 are primed for communication with the other party. Thus, the first user's time resources are saved by not having to input additional commands to thereby arrive at these control options.

Additionally, the first user 10 can be less hesitant to initiate communication with the second user 20 since the second user 20 has been primed for communication with first user 10 before the control options are provided. This can provide a reduction in stress for the first user 10.

In some examples control user interface of the telecommunication option 152 is configured to enable the first user 10 to compose a message and cause transmission of at least the composed message to the second user 20. In some examples the method 100 comprises auto-composition of the message or at least part of the message or may provide feedback 722 (as shown in FIG. 7) to the first user of subjects/topics to address in the message. The auto-composition or feedback 722 may be based upon those content features 712A-D having high salience within the recorded content 322 associated with the second user 20.

Though not shown, in some examples, the method 100 further comprises initiating communication between the first user 10 and the second user 20 upon actuation of the telecommunication option 152 by the first user 10.

Figure 2B:
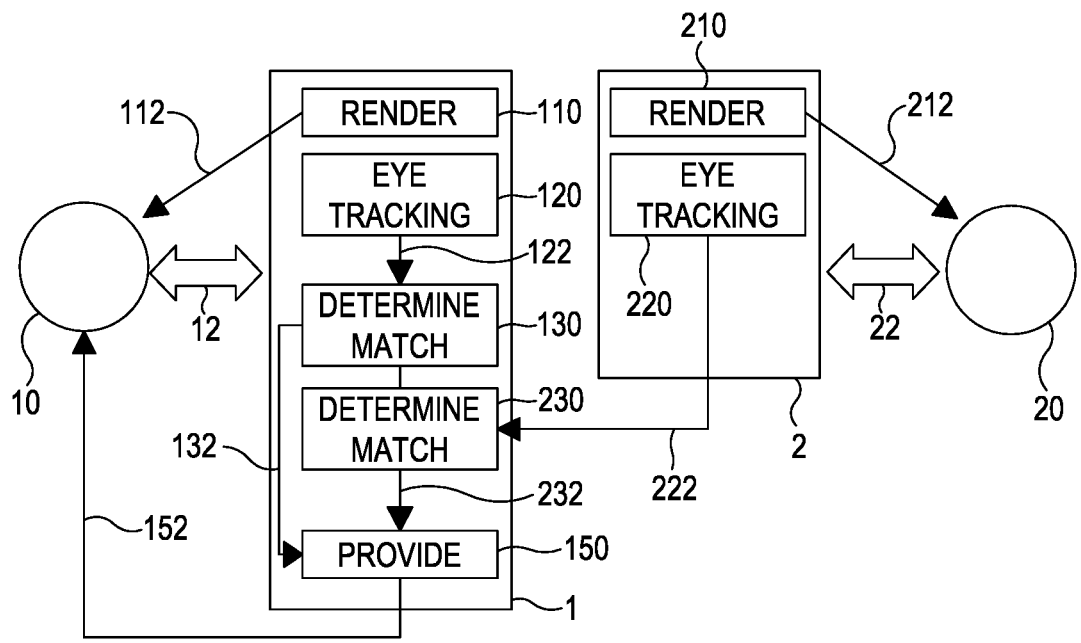
Figure 2C:
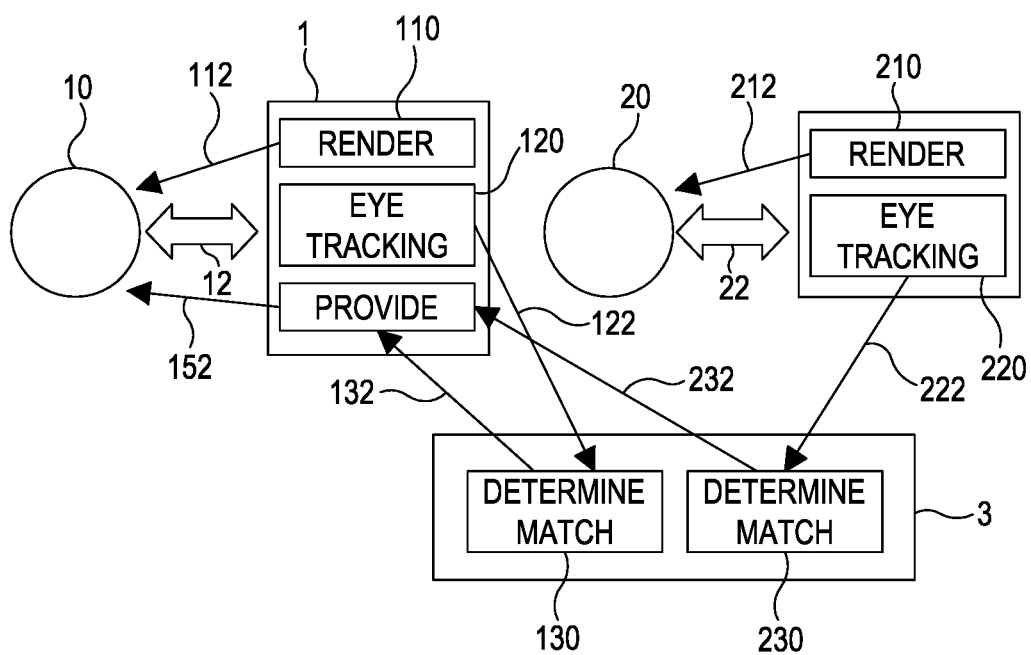

FIGS. 2A to C illustrate examples of how the method 100 shown in FIG. 1 and any equivalent method block performed in respect of the second user 20 may be distributed between different entities.

In the example of FIG. 2A there is provided a first apparatus 1 with which the first user 10 interacts 12 and a second apparatus 2 with which the second user 20 interacts 22.

Blocks 110 to 150 of the method 100 described in relation to FIG. 1 above are performed by the first apparatus 1 in this example. The second apparatus 2 performs method blocks 210 to 230, which are analogous to blocks 110 to 130. That is: at block 210, second content 212 is rendered to the second user 20, the second content 212 being based on recorded content 352 associated with the first user 10; at block 220, eye-tracking is performed in a time interval following the rendering of the second content 212 to obtain eye-tracking data 222 of the second user 20; and at block 230, second data 232 indicative of whether or not there is a match between the eye-tracking data 222 of the second user 20 and reference eye-tracking data 224 associated with recorded content 352 associated with the first user 10.

In this example the second apparatus 2 then transmits the second data 232 to the first apparatus 1 which receives the second data 232 (as per block 140) and provides the telecommunication option 152 (as per block 150) if both the first and second data 132, 232 are indicative of a match. However, it is to be appreciated that in other examples the second data 232 may only be transmitted when it is indicative of a match or another message or signal may be transmitted to the first apparatus 1 to confirm that the second data 232 is indicative of a match.

In the example of FIG. 2B, blocks 110 to 150 are performed by the first apparatus 1. Blocks 210 and 220 are performed by the second apparatus 2. The second apparatus 2 then, in distinction to the example of FIG. 2A, transmits the eye-tracking data 222 of the second user 20 to the first apparatus 1 which receives the eye-tracking data 222 of the second user 20 and which performs block 230 to determine the second data 232 indicative of whether or not there is a match between the eye-tracking data 222 of the second user 20 and the reference eye-tracking data 224 associated with the recorded content 352 associated with the first user 10.

To obtain the reference eye-tracking data 224, the first apparatus 1 may receive, with the eye-tracking data 222 of the second user 20, information about the recorded content 352 on which the second content 212 that the second user 20 was reacting to was based. A database of reference eye-tracking data can then be queried to obtain the reference eye-tracking data 224 associated with the recorded content 352. Alternatively the second apparatus 2 may transmit the reference eye-tracking data 224 to the first apparatus 1 in addition to the eye-tracking data 222 of the second user 20.

Where eye-tracking data 222 of the second user 20 is received by the first apparatus 1, a direct comparison of the eye-tracking data 122, 222 can be made. The decision to provide the telecommunication option 152 to the first user 10 can be based on a determination as to whether or not the eye-tracking data 122 of the first user 10 matches the eye-tracking data 222 of the second user 20. If the eye-tracking data 122 of the first user 10 matches the eye-tracking data 222 of the second user 20, it is determined to provide the telecommunication option 152 to the first user 10. The eye-tracking data 122, 222 can be pre-processed at the first and second apparatus 1, 2 respectively to reduce false positives from their direct comparison. The pre-processing can comprise comparing the eye-tracking data 122, 222 to reference eye-tracking data which is indicative of a minimum complexity for confidence that observed spontaneous eye movements are induced by recall. This reference eye-tracking data may be individualized to each user.

In the example of FIG. 2C, blocks 110 and 120 are performed by the first apparatus 1 and blocks 210 and 220 are performed by the second apparatus 2. Blocks 130 and 230 are performed by a remote device 3.

The remote device 3 receives eye-tracking data 122, 222 of the first and second users 10, 20 from the first and second apparatus 1, 2.

In some examples, having determined the first and second data 132, 232, the remote device 3 transmits the first and second data 132, 232 to the first apparatus 1. If both the first and second data 132, 232 are indicative of a match, the telecommunication option 152 is provided by the first apparatus 1 to the first user 10 (as per block 250). In other examples, the remote device 3 may instead transmit, to the first apparatus 1, instructions to provide the telecommunication option 152 to the first user 10. That is, a decision about whether or not to provide telecommunication option 152 may happen at either the first apparatus 1 upon receipt of first and second data 132, 232 or at the remote device 3 based on the determined first and second data 132, 232.

In a further alternative example, the determination of the first data 132 (as per block 130) can be performed by the first apparatus 1 and the determination of second data 232 (as per block 230) can be performed by the second apparatus 2. The first and second data 132, 232 are transmitted respectively from the first and second apparatus 1, 2 to the remote device 3. The remote device 3 determines if both the first and second data 132, 232 are indicative of a match and accordingly transmits, to the first apparatus 1, instructions to provide the telecommunication option 152 to the first user 10.

In a still further alternative example, where eye-tracking data 122 of the first user 10 is transmitted from the first apparatus 1 to the remote device 3 and eye-tracking data 222 of the second user 20 is transmitted from the second apparatus 2 to the remote device 3, a direct comparison of the eye-tracking data 122, 222 can be made. The decision to provide the telecommunication option 152 to the first user 10 can be based on a determination as to whether or not the eye-tracking data 122 of the first user 10 matches the eye-tracking data 222 of the second user 20. If the eye-tracking data 122 of the first user 10 matches the eye-tracking data 222 of the second user 20, it is determined to provide the telecommunication option 152 to the first user 10. Either the first and second apparatus 1, 2 respectively or the remote device 3 can perform pre-processing of the eye-tracking data 122, 222 to reduce false positives from their direct comparison. The pre-processing can comprise comparing the eye-tracking data 122, 222 to reference eye-tracking data which is indicative of a minimum complexity for confidence that observed spontaneous eye movements are induced by recall. This reference eye-tracking data may be individualized to each user.

In each of FIGS. 2A to C, the timing of blocks 110 to 130 and the timing of block 210 to 230 can be independent of each other. In some example, however, the first content 112 is rendered to the first user 10 (as per block 110) in response to receiving second data 232 which indicates a match between the eye-tracking data 222 of the second user 20 and the reference eye-tracking data 224 associated with the recorded content 352 associated with the first user 10. Alternatively, the first content 112 can be rendered in response to receiving a message or signal confirming that the second data 232 is indicative of a match. In either case, this means that, in the event that the first data 132 indicates a match, a delay between rendering the first content 112 to the first user 10 and provision of the telecommunication option 152 (as per block 150) is reduced. Thus, the first user 112 is provided with a prompt to initiate communication with the second user 20 shortly after recalling recorded content 322 associated with the second user 20.

In some examples, there can be a time limit between the determination of first data 132 and the determination of second data 232 such that even if both the first and second data 132, 232 are indicative of a match no telecommunication option 152 will be provided if the time limit is exceeded. The time limit could be one day. Match results occurring more than, for example, one day in the past may be considered "expired".

In some examples, rather than providing no telecommunication option 152 if the time limit is exceeded, a confirmatory action may be required. The method 100 can comprise rendering further content to the user having the earlier ("expired") match result. This further content is based on further recorded content associated with the other user. Eye-tracking data can then be obtained in the time interval following the rendering of the further content and this can be compared to reference eye-tracking data associated with the further recorded content in order to determine whether or not there is still a match result. In some examples the further content may be a repeat of the originally rendered content in respect of which the original match result, which "expired", was determined. In some examples the further content may be different such as the third and fourth content 812, 822 described in relation to FIG. 8 below.

Though not illustrated in the examples of FIGS. 2A to C, both the first and second users 10, 20 can be provided with a telecommunication option configured to initiate communication with the other user if both the first and second data 132, 232 are indicative of a match.

If the first data 132 is determined to indicate a match before the second data 232, the first user 10 can be provided the telecommunication option 152 once the second data 232 is determined to indicate a match. The second user 20 can be provided a telecommunication configured to initiate communication with the first user 10 as soon as the second data 232 is determined to indicate a match. Thus, the first and second users 10, 20 can be provided telecommunication options at substantially the same time.

If the second data 232 is determined to indicate a match during a time period when the first user 10 is not interacting with the first apparatus 1, the telecommunication option 152 can be provided to the first user 10 at the next time that the first user 10 interacts with the first apparatus 1 or specifically with the method 100 as performed at the first apparatus 1. The second user 20 can still be provided a telecommunication configured to initiate communication with the first user 10 as soon as the second data 232 is determined to indicate a match.

If the second user 20 actuates the telecommunication option provided to them in order to initiate communication with the first user 10 and does so before the first user 10 next interacts with the first apparatus 1 or specifically with the method 100 as performed at the first apparatus 1, then the first user 10 may not be provided with the telecommunication option 152 because the communication has already been initiated between the first and second user 10, 20.

FIGS. 3A and 3B illustrate examples of blocks in the method 100 preceding the rendering of the first content 112 to the first user 10 (as per block 110) and/or the rendering of second content 212 to the second user 20 (as per block 210).

At block 310, the second user 20 is selected from one or more of the first user's stored social connections. The stored social connections can comprise contacts in a database, and/or connections on a social networking service. The selection of the second user 20 can comprise the selection of each stored social connection in turn. This can be restricted to only those stored social connections in respect of whom there is associated at least one recorded content which is accessible and retrievable by the first apparatus 1 or the remote device 3. The recorded content can be accessed and retrieved from a database within a memory at the first apparatus 1 or remote device 3.

Recorded content can be associated with a stored social connection by means of comprising a representation of the stored social connection (for example a photo in which the stored social connection appears or is the subject) and/or by means of metadata, stored with or in association with the recorded content, that identifies the stored social connection.

At block 320, the recorded content 322 associated with the selected second user 20 and upon which the first content 112 is to be based is identified. In instances where multiple recorded content are associated with the second user 20, identifying the recorded content 322 comprises selecting it from amongst the aforementioned multiple recorded content. The selection can be based on multiple criteria.

One criterion may be whether or not the first user 10 is also associated with the recorded content. That is, the criterion may be whether or not both the first and second users 10, 20 are associated with the recorded content.

Another criterion may be whether or not there is an established interaction history between the first user 10 and the recorded content. An established interaction history can comprise a record that the first user 10 caused the recording of the recorded content such as by capturing a photo in which the second user 20 appears). An established interaction history can comprise a record that the first user 10 has previously viewed the recorded content. A comment left on the recorded content by the first user 10, a "like" or "retweet" or similar of the recorded content by the first user 10, and eye-tracking data of the first user 10 stored in association with the recorded content, are all examples of evidence that the first user 10 has previously viewed the recorded content.

Another criterion may be whether or not any representation of the second user 20 in the recorded content is a salient feature of the recorded content.

Another criterion may be whether or not reference eye-tracking data associated with the recorded content is distinctive or complex enough to enable determination, with confidence, that this recorded content is recalled if matched by eye-tracking data 122 of the first user 10.

Another criterion may be whether or not predefined content manipulations can be readily applied to the recorded content in order to generate the first content 112 that is to be rendered to the first user 10.

At block 330, the first content 112 is determined based on the identified recorded content 322 associated with the selected second user 20.

In some examples the recorded content 322 is edited to create the first content 112. The recorded content 322 can be used to query a lookup table of predefined manipulations to apply to the recorded content 322 in order to create the first content 112. For example, the recorded content 322 can be edited to produce the first content 112 which comprises the first part of recorded content 322 and does not include the second part of recorded content 322.

The recorded content 322 can comprise visual content such as one or more images or a video sequence.

The first content 112 can comprise an image where a significant portion of the image is omitted, prompting the first user 10 to recall and visualize the omitted portion of the image.

The first content 112 can comprise a group of images where a significant image is omitted, prompting the first user 10 to recall and visualize the omitted image.

The first content 112 can comprise a video sequence which comprises one or more parts of a number sequence which the first user 10 has previously viewed, prompting the first user 10 to recall and visualize the salient parts that have been omitted.

The omitted parts may comprise a representation of the second user 20.

In other examples the first content 112 comprises content stored in association with the recorded content 322 associated with the second user 20. For example, where the identified recorded content 322 is an image in a photo album, the first content 112 can comprise the album cover image and/or one or more other images in the photo album besides the identified recorded content 322.

The first content 112 can comprise user generated content stored in associated with the identified recorded content 322. For example, the first content 112 can comprise text associated with the identified recorded content 322 such as; a title of a photo album in which the recorded content 322 is comprised; a caption for the recorded content 322; or a comment on the recorded content 322.

Once the first content 112 has been determined as per block 330, the first content 112 is rendered to the first user 10 as per block 110.

In some examples rendering the first content 112 to the first user 10 is an automatic response to the determination of the first content 112 in block 330.

In other examples, the rendering of the first content 112 to the first user 10 is conditional on other factors. For example, the first content 112 can be rendered to the first user 10 (as per block 110) in response to determining that a frequency of communication between the first and second users 10, 20 is below a threshold frequency. This threshold frequency may represent that unprompted re-connection between the first and second users 10, 20 is unlikely. The first content 112 can be rendered to the first user 10 (as per block 110) in response to determining that the frequency of communication between the first and second users 10, 20 has decreased to below the threshold frequency.

Instead of performing blocks 320 and 330 in respect of each stored social connection in turn, the selection of the second user 20 (as per block 310) can comprise determining a frequency of communication between the first user 10 and the stored social connections and selecting as the second user 20 that stored social connection with whom the first user's frequency of communication is below, or has decreased to below, the threshold frequency.

The stored social connections from whom the second user 20 can be selected may be further filtered according to relationship strengths. Relationship strengths can be determined according to attribute similarities and/or interactions as described in Xiang, R., Neville, J., & Rogati, M. (2010, April). Modeling relationship strength in online social networks. *In Proceedings of the* 19th *international conference on World wide web* (pp. 981-990). ACM. Interactions may be parameterized by contact frequency and timing (for example, work hours vs. free time), the mood or stress of the first user 10 during and after interactions with respective stored social connections, as well as instances of active re-connection over digital media.

Additionally or alternatively, the rendering of the first content 112 to the first user 10 (as per block 110) can be conditional on a classification of a monitored behavior of the first user 10. The monitored behavior can comprise, for example, the emotions or availability of the first user 10.

The emotions of the first user can be determined based on actions of the first user 10. Actions upon which a determination of the emotions of the first user 10 can be made comprise: user inputs to the first apparatus 1 such as text comments from which a sentiment can be derived using natural language processing and/or the manner in which the user inputs are made which may be parameterized by, for example, the number, frequency, and force (such as pressure on a touch screen) of the inputs; and body movements of the first user 10, including facial expressions. The emotions of the first user can be determined based on physiological parameters of the first user 10 such as: heart rate, breathing rate, and body temperature.

The availability of the first user 10 can be determined based on, for example: a time-of-day, where, for example, times at which the first user 10 is typically available can be set by the first user 10 or learned by monitoring the first user's usage of the first apparatus 1 over time; a type of user input being made, where, for example, repeated scrolling inputs indicates absent-minded usage and thus availability; and an identity or classification of a current foreground application running on the first apparatus 1, where, for example, a social networking service is indicative of availability, particularly for communication with a stored social connection.

FIG. 3B illustrates an example of method blocks leading to the determination of the second content 212 to be rendered to the second user 20 as per block 210.

At block 340, the first user 10 is selected. Similar to block 310, the selection of the first user 10 could be a selection of each of the second user's stored social connections in turn or could be based on a determination that the second user's frequency of communication with a particular stored social connection is below, or has decreased to below, a threshold frequency.

Alternatively, the selection of the first user 10 can be responsive to the selection of the second user 20 in block 310. For example, if the second apparatus 2 performs block 340, the second apparatus 2 can receive a signal indicating that the second user 20 has been selected in block 310.

At block 350, the recorded content 352 associated with the selected first user 10 and upon which the second content 212 is to be based is identified. Identifying the recorded content 352 can comprise selecting it from amongst the multiple recorded content associated with the first user 10. The selection can be based on multiple criteria.

One criterion may be whether or not the second user 20 is also associated with the recorded content.

Another criterion may be whether or not there is an established interaction history between the second user 20 and the recorded content.

Another criterion may be whether or not any representation of the first user 10 in the recorded content is a salient feature of the recorded content.

Another criterion may be whether or not reference eye-tracking data associated with the recorded content is distinctive or complex enough to enable determination, with confidence, that this recorded content is recalled if matched by eye-tracking data 222 of the second user 20.

Another criterion may be whether or not predefined content manipulations can be readily applied to the recorded content in order to generate the second content 212 that is to be rendered to the second user 20.

At block 360, the second content 212 is determined based on the identified recorded content 352 associated with the selected first user 10.

The recorded content 352 can be edited to produce the second content 212 which comprises a first part of recorded content 352 and does not include a second part of recorded content 352.

The second content 212 can comprise content stored in association with the recorded content 352 associated with the first user 10. The second content 212 can comprise user-generated content stored in associated with the identified recorded content 352.

The method blocks illustrated in FIG. 3A can be performed by the first apparatus 1 and the method blocks illustrated in FIG. 3B can be performed by the second apparatus 2.

Alternatively, one or more of the method blocks illustrated in FIGS. 3A and 3B, including all of the method blocks illustrated in FIGS. 3A and 3B, can be performed at the remote device 3.

It is also to be appreciated that the selection of the first and second users 10, 20 as per blocks 310 and 340 may comprise a single block.

In some examples, rather than separately identifying recorded content 322 associated with the second user 20 and recorded content 352 associated with the first user 10, a single method block may identify recorded content associated with both the first user 10 and the second user 20.

Where the first content 112 and second content 212 are determined based on the recorded content associated with both the first user 10 and the second user 20, the first and second content 122, 212 may be personalized for each user 10, 20 by separate method blocks 330 and 360. Alternatively, the first and second content 112 and 212 could be the same and determined by a single method block.

Figure 4:
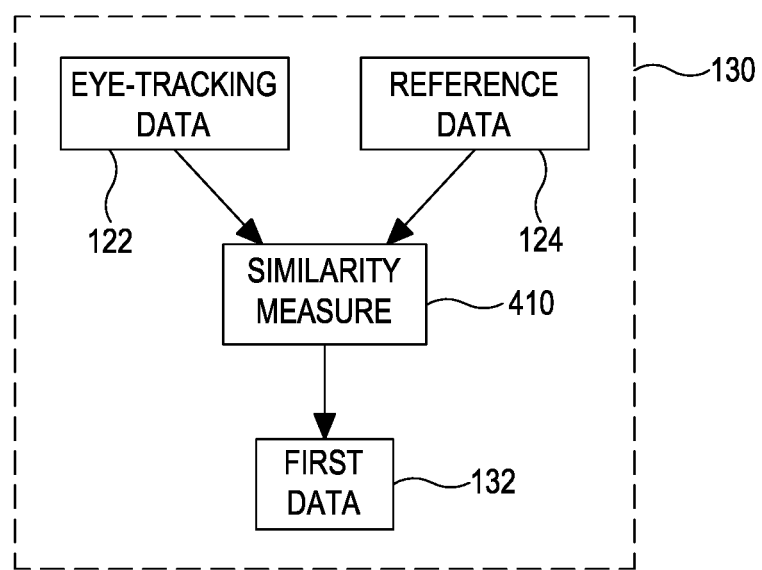
FIG. 4 illustrates an example of determining a match.

FIG. 4 illustrates an example of determining first data 132 (as per block 130). The eye-tracking data 122 of the first user 10 and the reference eye-tracking data 124 associated with the recorded content 322 associated with the second user 20 are input into a similarity measure 410. The similarity measure 410 is configured to quantify the similarity between the eye-tracking data 122 of the first user 10 and the reference eye-tracking data 124. The greater the similarity, the larger the value returned by the similarity measure 410. When the similarity measure 410 between the eye-tracking data 122 of the first user 10 and the reference eye-tracking data 124 exceeds a threshold value, the first data 132 indicates a match. The similarity measure 410 may be, or may be based on, the Hausdorff distance or the Freshet distance in order to quantify the similarity between a path described by the eye-tracking data 122 of the first user 10 and a path described by the reference eye-tracking data 124. The similarity measure 410 may be, or may be based on, principal component analysis, the Hausdorff distance, or a mean or mean squared distance of the points in order to quantify the similarity between a set of fixation points described by the eye-tracking data 122 of the first user 10 and a set of points described by the reference eye-tracking data 124.

It is to be appreciated that the similarity measure 410 could be replaced with a difference measure and the first data 132 would then indicate a match when the difference measure is below a threshold value.

In some examples the similarity measure 410 could be implemented by a match evaluation model that has been trained through machine learning with training data comprising matched pairs and non-matched pairs. Matched pairs comprise eye-tracking data during an encoding event and eye-tracking data during a recall event, wherein the encoding and recall are in respect of the same content. Non-matched pairs comprise eye-tracking data during an encoding event and eye-tracking data during a recall event, wherein the encoding and recall are in respect of different content.

Thus, when the eye-tracking data 122 of the first user 10 and the reference eye-tracking data 124 associated with the recorded content 322 associated with the second user 20 are input into the match evaluation model, the match evaluation model returns an indication as to whether they constitute a matched pair or a non-matched pair. The first data 132 is determined based on this output of the match evaluation model.

Figure 5:
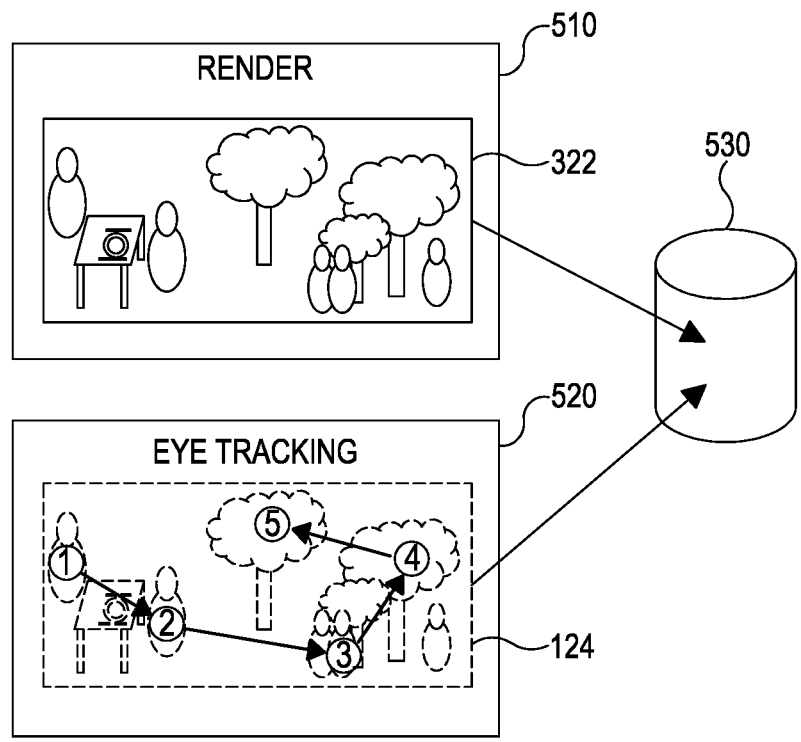
FIG. 5 illustrates an example of producing reference eye-tracking data.

FIG. 5 illustrates an example of producing the reference eye-racking data 124 associated with the recorded content 322 associated with the second user 20. At block 510, the recorded content 322 is rendered to the first user 10, the second user 20, or a third party who may be one of the stored social connections of the first user 10. At block 520, eye-tracking is performed in respect of the person to whom the recorded content 322 is rendered. The eye tracking is performed in a time interval following the rendering of the recorded content 322.

The obtained eye-tracking data (a visual representation of which is shown in FIG. 5) is used as reference eye-tracking data 124 in the method 100 as described in the foregoing. The reference eye-tracking data 124 is stored in association with the recorded content 322 in storage 530 which is accessible to the first apparatus 1, second apparatus 2, and/or remote device 3. The storage 530 may be a database within the memory 1014 of the first apparatus 1 or a database with the memory of the remote device 3

As a result, the reference eye-tracking data 124 associated with the recorded content 322 associated with the second user 20 is based on: eye-tracking data recorded while the first user 10 viewed the recorded content 322 at an earlier time than the performance of the method 100; eye-tracking data of the second user 20 in respect of the recorded content 322; or eye-tracking data of a third party in respect of the recorded content 322.

It is also to be appreciated that the reference eye-racking data 124 may not be any one person's individual eye-tracking data but may be produced as an average of multiple persons' eye-tracking data in respect of the recorded content 322.

Figure 6:
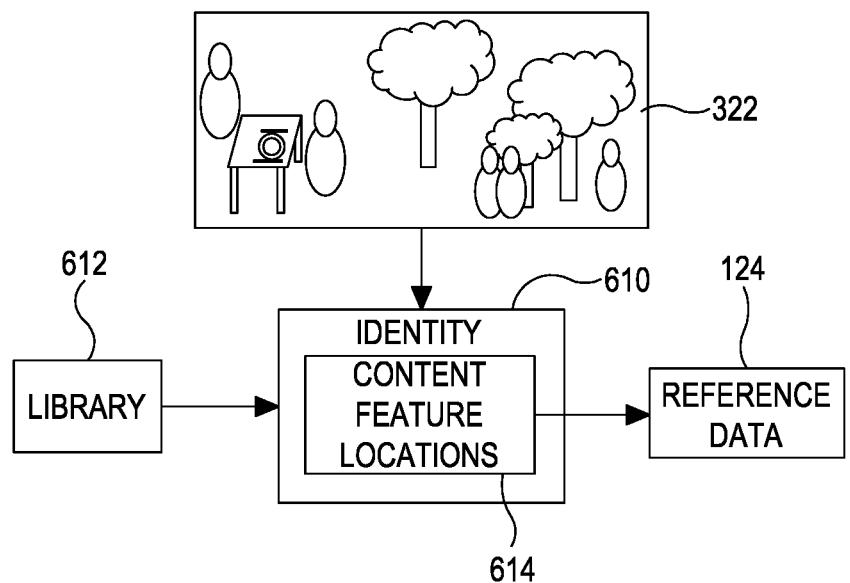
FIG. 6 illustrates another example of producing reference eye-tracking data.

FIG. 6 illustrates another example of producing reference eye-tracking data 124 associated with the recorded content 322 associated with the second user 20. In this example the reference eye-tracking data 124 is based on content features identified in the recorded content 322.

At block 610, the locations 614 of high-level content features within the recorded content 322 are identified. Low level features of the recorded content 322 are extracted and grouped, by pattern matching, to infer the presence of higher-level content features. The locations 614 of these content features within the recorded content 322 are used to produce the reference eye-tracking data 124.

In some examples, the extracted content features are compared to a library 612 of high-level content features which are deemed salient. The library 612 may be personalized to the first user 10 by including high-level content features which the first user 10 has specified to be salient or which are learned to be salient to the first user 10 using machine learning on training data comprising eye-tracking data of the first user 10 in respect of other content. The reference eye-tracking data 124 may then be based on the locations 614 of only those extracted content features which are deemed salient by reference to the library 612.

In some examples the extracted content features can be ranked by salience, using the library 612, and a path can be defined between the location 614 of the most salient content feature to the next most salient content feature and so on. The reference eye-tracking data 124 may be based on this path.

The reference eye-tracking data 124 can be stored in association with the recorded content 322 in the storage 510 or, if produced substantially contemporaneously with the determination to the first content 112 (as per block 330) may be cached or otherwise temporarily recorded for use in block 130.

FIG. 7 illustrates an example of further processing of the eye-tracking data 122 of the first user 10. In this example, the eye-tracking data 122 of the first user 10 is processed to determine one or more content features 712A-D.

The content features 712A-D may be those most salient to the first user 10 or most strongly recalled by the first user 10. The content features 712A-D may be those recalled by both the first and second users 10, 20. The content features 712A-D may therefore indicate topics over which the first and second users 10, 20 can re-connect.

At block 710, the eye-tracking data 122 of the first user 10 is compared with the reference eye-tracking data 124 associated with the recorded content 322 associated with the second user 20. One or more fixation points of the first user 10 which match the reference eye-tracking data 124 are determined. Based on the fixation duration at these one or more fixation points, the one or more content features 712A-D can be determined. Where the fixation duration at a fixation point exceeds a threshold duration, the location of that fixation point is used to query the recorded content 322 to determine the content feature at that location. The threshold duration is configured to create differentiation between high salience content features and low salience content features.

If the recorded content 322 associated with the second user 20 and the recorded content 352 associated with the first user 10 are the same, then at block 710 the eye-tracking data 122 of the first user 10 can be compared with the eye-tracking data 222 of the second user 20. One or more fixation points at which the eye-tracking data 122 of the first user 10 matches the eye-tracking data 222 of the second user 20 are determined. The locations of these one or more fixation points are used to query the recorded content 322, 352 to determine the one or more content features 712A-D at the respective locations.

The matching of one or more fixation points between the eye-tracking data 122 of the first user 10 and either the reference eye-tracking data 124 or the eye-tracking data 222 of the second user 20 can be spatially and/or temporally resolved. For example, spatial matching can indicate spatial parts (areas) of the recorded content 322 for which the first user 10 and optionally second user 20 have strong recall and temporal matching can indicate temporal parts (sequences) of the recorded content 322 for which the first user 10 and optionally second user 20 have strong recall.

At block 720, the first user 10 is provided with feedback 722 based on the determined one or more content features 712A-D. In some examples the feedback 722 is provided with the provision of the telecommunication option 152 (as per block 150). This can encourage the first user 10 to initiate the communication with the second user 20 since the first user 10 may be prompted with topics to re-connect over by means of the feedback 722. The feedback 722 may be provided before enabling actuation of the telecommunication option 152 to initiate communication between the first user 10 and the second user 20. In other examples the feedback 722 is provided after enabling actuation of the telecommunication option 152, for example, during communication between the first user 10 and the second user 20.

Figure 8:
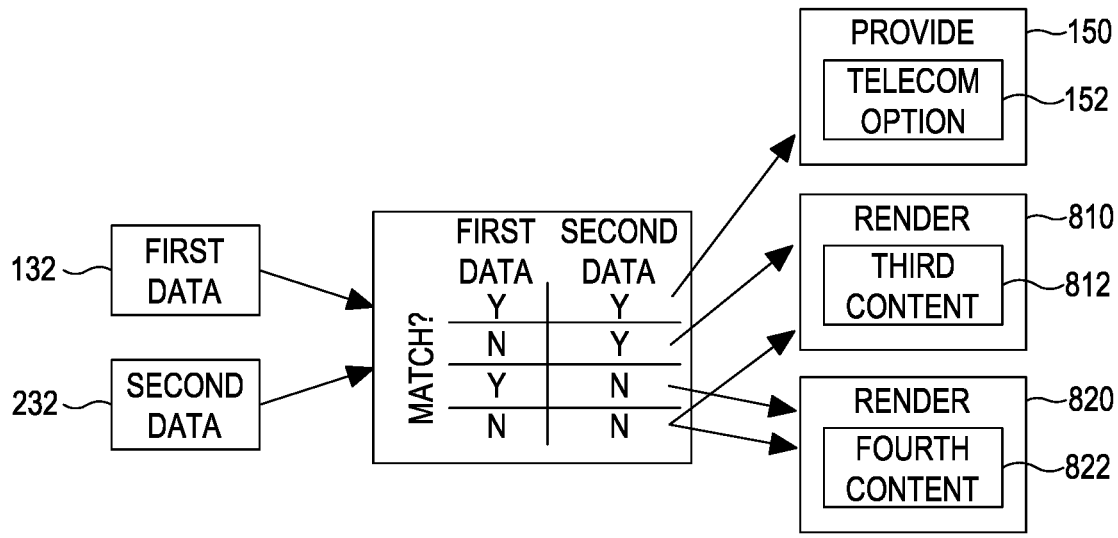
FIG. 8 illustrates an example of decision rules.

FIG. 8 illustrates an example of decision rules in relation to the first and second data 132, 232.

As described in the foregoing, if both the first data 132 and the second data 232 are indicative of a match, then the method 100 proceeds to block 150. At block 150, the method 100 comprises providing the first user 10 with the telecommunication option 152 configured to initiate communication with the second user 20.

However, if the first data 132 is not indicative of a match and the second data 232 is indicative of a match, then the method 100 proceeds to block 810. At block 810, the method 100 comprises rendering third content 812 to the first user 10. The third content 812 is based on further recorded content associated with the second user 20. Eye-tracking data of the first user 10 can then be obtained in the time interval following the rendering of the third content 812 and new first data can be obtained based on this eye-tracking data.

If the first data 132 is indicative of a match and the second data 232 is not indicative of a match, then the method 100 proceeds to block 820. At block 820, the method 100 comprises rendering fourth content 822 to the second user 20. The fourth content 822 is based on further recorded content associated with the first user 10. Eye-tracking data of the second user 20 can then be obtained in the time interval following the rendering of the fourth content 822 and new second data can be obtained based on this eye-tracking data.

If neither the first data 132 nor the second data 232 are indicative of a match, then the method 100 proceeds to blocks 810 and block 820 whereby the third content 812 is rendered to the first user 10 and the fourth content 822 is rendered to the second user 20. Eye-tracking data of the first user 10 can then be obtained in the time interval following the rendering of the third content 812 and new first data can be obtained based on this eye-tracking data. Eye-tracking data of the second user 20 can then be obtained in the time interval following the rendering of the fourth content 822 and new second data can be obtained based on this eye-tracking data.

In some examples, the above described decision rules are modified by one or more further conditions relating to an emotional response 922 of the first user 10 following the rendering of the first content 112 (as shown in FIG. 9) and/or an emotional response of the second user 20 following the rendering of the second content 212.

If a match is accompanied by a positive emotional response, the above decision rules are unchanged. If a match is accompanied by an emotional response which has inconclusive polarity, third or fourth content 812, 822 is rendered to the respective user or the respective user is prompted to input the polarity of their emotional response. If a match is accompanied by a negative emotional response, this indicates that the respective user is unlikely to wish to communicate with the other user therefore the method 100 can be suspended and no further outputs provided.

FIG. 9 illustrates an example of determining an emotional response 922 of the first user 10.

After rendering the first content 112 to the first user 10 (as per block 110) the method 100 proceeds to block 910 in addition to block 120 as described in the foregoing. At block 910, the method 100 comprises sensing a response 912 of the first user 10 to the first content 112.

At block 920, the method 100 comprises analysis of the sensed response 912 of the first user 10 to determine an emotional response 922 of the first user 10 to the first content 112. In some examples this comprises providing the sensed response 912 as an input to an emotion recognition model to determine the emotional response 922 of the first user 10 to the first content 112.

In some examples sensing the response 912 of the first user 10 to the first content 112 comprises sensing one or more actions performed by the first user 10 in a time interval following the rendering of the first content 112. This may be the same time interval in which eye tracking is performed to obtain the eye-tracking data 122 of the first user 10 (as per block 120).

The sensed one or more actions can be provided as an input to an emotion recognition model that has been trained, through machine learning, to learn a mapping between actions and emotions. The training data used in the machine learning may comprise actions previously performed by the first user 10 labelled with the known emotions of the first user 10 at the time of performing the respective actions. The emotion recognition model returns the emotional response 922 of the first user 10 to the first content 112.

The one or more actions which are sensed in order to obtain the response 912 of the first user 10 can comprise a user input to the first apparatus 1 made in association with the first content 112. For example, the user input may be a comment made on the first content 112. The comment may be made orally or via text input. In this example, the emotion recognition model can be based on a natural language processing model to thereby determine, as the emotional response 922, a sentiment of the comment. In another example, the user input may be a "like", "retweet", or similar. In this example, the user input is inherently positive and thus the block 920 may be omitted from the method 100.

The one or more actions which are sensed in order to obtain the response 912 of the first user 10 can comprise one or more movements of the first user 10. The movements may be body movements (for example, a gesture or recognisable body language) or facial movements.

Facial movements that can be sensed may comprise one or more of: eye movements, facial muscle movements, and head movements. An emotion recognition model may be based on the Facial Action Coding System (FACS) which encodes facial movement from changes in facial appearance. Table 1 shows the action unit (AU) combinations which indicate different emotions.

TABLE 1

Emotions and the corresponding AU combinations.

| Emotion | AUs | FASC names |
|---|---|---|
| Happiness | 6 + 12 | Cheek raiser + Lip corner puller |
| Sadness | 1 + 4 + 15 | Inner brow raiser + Brow lowerer + Lip corner depressor |

TABLE 1-continued

Emotions and the corresponding AU combinations.

| Emotion | AUs | FASC names |
|---|---|---|
| Surprise | 1 + 2 + 5B + 26 | Inner brow raiser + Outer brow raiser + Upper lid raiser (slight) + Jaw drop |
| Fear | 1 + 2 + 4 +5 + 7 + 20 + 26 | Inner brow raiser + Outer brow raiser + Brow lowerer + Upper lid raiser + Lid tightener + Lip stretcher + Jaw drop |
| Anger | 4 + 5 + 7 + 23 | Brow lowerer + Upper lid raiser + Lid tightener + Lip tightener |
| Disgust | 9 + 15 + 16 | Nose wrinkler + Lip corner depressor + Lower lip depressor |
| Contempt | R12A + R14A | Lip corner puller (right side) + Dimpler (right side) |

Happiness can be considered a positive emotional response. Sadness and surprise can be considered to have inconclusive polarity. Fear, anger, disgust, and contempt can be considered negative emotional responses.

In some examples sensing the response 912 of the first user 10 to the first content 112 comprises physiological sensing in a time interval following the rendering of the first content 112.

Sensed values of physiological parameters can be provided as inputs to an emotion recognition model that has been trained, through machine learning, to learn a mapping between physiological parameters and emotions. The training data used in the machine learning may comprise previous values of physiological parameters of the first user 10 labelled with the known emotions of the first user 10 at the time of sensing the respective values. The emotion recognition model returns the emotional response 922 of the first user 10 to the first content 112.

Examples of physiological parameters that may be sensed include: heart rate; breathing rate; and body temperature. Other examples include oxygen saturation, blood pressure and sweat.

Besides providing the telecommunication option 152 to the first user 10, further recorded content associated with the second user 20 can be rendered to the first user 10 in response to both the first and second data 132, 232 indicating a match. Additionally, this further recorded content may be based on the content features 712A-D which are determined by analysis of the eye-tracking data 122 of the first user 10.

FIG. 10 illustrates an example of a controller 1010. Implementation of a controller 1010 may be as controller circuitry. The controller 1010 may be implemented in hardware alone, have certain aspects in software including firmware alone or can be a combination of hardware and software (including firmware).

As illustrated in FIG. 10 the controller 1010 may be implemented using instructions that enable hardware functionality, for example, by using executable instructions of a computer program 1016 in a general-purpose or special-purpose processor 1012 that may be stored on a computer readable storage medium (disk, memory etc) to be executed by such a processor 1012.

The processor 1012 is configured to read from and write to the memory 1014. The processor 1012 may also comprise an output interface via which data and/or commands are output by the processor 1012 and an input interface via which data and/or commands are input to the processor 1012.

The memory 1014 stores a computer program 1016 comprising computer program instructions (computer program code) that controls the operation of the first apparatus 1 when loaded into the processor 1012. The computer program instructions, of the computer program 1016, provide the logic and routines that enables the apparatus to perform the methods illustrated in Figs [FREF]. The processor 1012 by reading the memory 1014 is able to load and execute the computer program 1016.

The first apparatus 1 therefore comprises:
at least one processor 1012; and
at least one memory 1014 including computer program code
the at least one memory 1014 and the computer program code configured to, with the at least one processor 1012, cause the first apparatus 1 at least to perform:
rendering first content 112 to the first user 10, the first content 112 being based on recorded content 322 associated with the second user 20;
eye tracking in a time interval following the rendering of the first content 112 to obtain eye-tracking data 122 of the first user 10;
determining first data 132 indicative of whether or not there is a match between the eye-tracking data 122 of the first user 10 and reference eye-tracking data 124 associated with the recorded content 322 associated with the second user 20;
receiving second data 232 indicative of whether or not there is a match between eye-tracking data 222 of the second user 20 and reference eye-tracking data 224 associated with recorded content 352 associated with the first user 10; and
if both the first and second data 132, 232 are indicative of a match, then providing the first user 10 with a telecommunication option 152 configured to initiate communication with the second user 20.

As illustrated in FIG. 11, the computer program 1016 may arrive at the first apparatus 1 via any suitable delivery mechanism 1110. The delivery mechanism 1110 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 1016. The delivery mechanism may be a signal configured to reliably transfer the computer program 1016. The first apparatus 1 may propagate or transmit the computer program 1016 as a computer data signal.

Computer program instructions for causing an apparatus to perform at least the following or for performing at least the following:
causing rendering of first content 112 to the first user 10, the first content 112 being based on recorded content 322 associated with the second user 20;
causing eye tracking in a time interval following the rendering of the first content 112 to obtain eye-tracking data 122 of the first user 10;
determining first data 132 indicative of whether or not there is a match between the eye-tracking data 122 of the first user 10 and reference eye-tracking data 124 associated with the recorded content 322 associated with the second user 20;
obtaining second data 232 indicative of whether or not there is a match between eye-tracking data 222 of the second user 20 and reference eye-tracking data 224 associated with recorded content 352 associated with the first user 10; and if both the first and second data 132, 232 are indicative of a match, then causing the first user 10 to be provided with a telecommunication option 152 configured to initiate communication with the second user 20.

The computer program instructions may be comprised in a computer program, a non-transitory computer readable medium, a computer program product, a machine readable medium. In some but not necessarily all examples, the computer program instructions may be distributed over more than one computer program.

Although the memory 1014 is illustrated as a single component/circuitry it may be implemented as one or more separate components/circuitry some or all of which may be integrated/removable and/or may provide permanent/semi-permanent/dynamic/cached storage.

Although the processor 1012 is illustrated as a single component/circuitry it may be implemented as one or more separate components/circuitry some or all of which may be integrated/removable. The processor 1012 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims.

As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIGS. 1 to 9 may represent steps in a method and/or sections of code in the computer program 1016. The illustration of a particular order to the blocks does not necessarily imply that there is a required or preferred order for the blocks and the order and arrangement of the block may be varied. Furthermore, it may be possible for some blocks to be omitted.

FIG. 12 illustrates an example of the first apparatus 1.

In this example, the first apparatus 1 comprises the controller 1010 of FIG. 10. In other examples the first apparatus 1 may comprise any computer or machine capable of reading the computer program 1016 from the delivery mechanism 1110 of FIG. 11 and running that computer program 1016.

The first apparatus 1 further comprises at least one user interface 1220. The at least one user interface 1220 may comprise any means suitable for rendering an output to the first user 10 and/or receiving user input.

The first content 112 can be rendered to the first user 10 via the at least one user interface 1220. For example, where the first content 112 comprises visual content, the at least one user interface 1220 comprises a display. If the first content 112 comprises audio content, the at least one user interface 1220 can comprise a speaker.

The telecommunication option 152 can be provided to the first user 10 via the at least one user interface 1220. The first user 10 can actuate the telecommunication option 152 to initiate communication with the second user 10 via the at least one user interface 1220. For example, the at least one user interface 1220 may be a touch screen display.

The first apparatus 1 further comprises one or more sensors 1210. The one or more sensors may comprise any means suitable for performing eye tracking in respect of the first user 10 and/or for sensing a response 912 of the first user 10.

The eye-tracking data 122 of the first user 10 can be obtained using a camera which obtains image data of the eyes of the first user 10. The camera may be positioned proximate a display which renders the first content 112 to the first user 10 and configured to capture image data from a field of view in front of the display.

The camera can also be utilized for capturing image data from which actions of physiological parameters (as described in relation to FIG. 9 above) can be sensed. For example, body and facial movements can be sensed from image data. Likewise, for example, breathing rate and body temperature (by means of skin color changes) can be sensed from image data.

A microphone can be used to obtain oral user inputs. The microphone can also be used to, for example, sense a breathing rate of the first user 10.

An infrared heat sensor can be used to measure a body temperature of the first user 10.

A wearable inertial measurement unit (IMU) can be used to detect facial expressions. The wearable IMU can be worn in or on the ear. The wearable IMU may be configured as an earbud and may comprise a speaker for rendering content to the first user 10. The data from the IMU can be correlated with facial expressions either through a plurality of predetermined threshold values or through a model that has been trained, through machine learning, using training data comprising data from the IMU labelled with corresponding facial expressions. The training may be a supervised classification.

Other wearable sensors can be used to measure physical physiological parameters or biochemical physiological parameters. These wearable sensors can be invasive or non-invasive. The use of such wearable sensors can enable, for example, pulse oximetry, blood pressure monitoring, and sweat monitoring.

The first apparatus 1 further comprises at least one transceiver 1230. The at least one transceiver 1230 may comprise any suitable means for receiving and/or transmitting information.

Information that is transmitted could comprise, for example:
- an identification of the second user 20;
- eye-tracking data 122;
- the first data 132;
- signals, messages, or other information to a known address of the second user 20 within the telecommunication network.

The information that is transmitted may be transmitted with or without local storage of the data in the memory 1014 at the first apparatus 1 and with or without local processing of the data by circuitry or processors 1012 at the first apparatus 1.

Information that is received could comprise, for example:
- the recorded content 322;
- the first content 112
- instructions to render the first content 112;
- reference eye-tracking data 124;
- eye-tracking data 222 of the second user 20;
- reference eye-tracking data 224;
- the second data 232;
- information that the second data 232 indicates a match;
- instructions to provide the telecommunication option 152; and/or
- signals, messages, or other information from a known address of the second user 20 within the telecommunication network.

The at least one transceiver 1230 may comprise one or more transmitters and/or receivers. The at least one transceiver 1230 may enable a wireless connection between the first apparatus 1 and the second apparatus 2, the remote device 3, or wearable sensors for sensing a response 912 of the first user 10.

The wireless connection could be via short-range radio communications such as Wi-Fi or Bluetooth, for example, or over long-range cellular radio links or any other suitable type connection.

In some examples the first apparatus 1 is an electronic device. The first apparatus 1 may be an electronic communications device such as a personal computer. The first apparatus 1 may be a portable electronic communications device such as a handheld electronic communications device or a wearable electronic communications device. The first apparatus 1 may be configured for mobile cellular communication. The first apparatus 1 may be a smartphone, a smartwatch, or another type of portable personal computer.

It is to be appreciated that the first apparatus 1 may comprise any suitable means for performing the functions hereinbefore described.

Consequently, in some examples, the first apparatus 1 comprises means for:
- rendering first content 112 to the first user 10, the first content 112 being based on recorded content 322 associated with the second user 20;
- eye tracking in a time interval following the rendering of the first content 112 to obtain eye-tracking data 122 of the first user 10;
- determining first data 132 indicative of whether or not there is a match between the eye-tracking data 122 of the first user 10 and reference eye-tracking data 124 associated with the recorded content 322 associated with the second user 20;
- receiving second data 232 indicative of whether or not there is a match between eye-tracking data 222 of the second user 20 and reference eye-tracking data 224 associated with recorded content 352 associated with the first user 10; and
- if both the first and second data 132, 232 are indicative of a match, then providing the first user 10 with a telecommunication option 152 configured to initiate communication with the second user 20.

One or more functions or means for performing functions hereinbefore described can be performed or located remotely from the first apparatus 1. For example, as per FIGS. 2A to C, they may be performed or located at the second apparatus 2 or the remote device 3. Thus, it is to be appreciated that the method described in the foregoing may be implemented by a system which may involve a distributed network of devices.

Consequently, in some examples there is provided a system comprising means for:
- rendering first content 112 to the first user 10, the first content 112 being based on recorded content 322 associated with the second user 20;
- rendering second content 212 to the second user 20, the second content 212 being based on recorded content 352 associated with the first user 10;
- eye tracking in a time interval following the rendering of the first content 112 to obtain eye-tracking data 122 of the first user 10;
- eye tracking in a time interval following the rendering of the second content 212 to obtain eye-tracking data 222 of the second user 20;
- determining first data 132 indicative of whether or not there is a match between the eye-tracking data 122 of the first user 10 and reference eye-tracking data 124 associated with the recorded content 322 associated with the second user 20;
- determining second data 232 indicative of whether or not there is a match between the eye-tracking data 222 of the second user 20 and reference eye-tracking data 224 associated with the recorded content 352 associated with the first user 10; and
- if both the first and second data 132, 232 are indicative of a match, then providing the first user 10 with a telecommunication option 152 configured to initiate communication with the second user 20.

Although in the foregoing, the recall of both the first and second users 10, 20 has been tested based on eye tracking whereby the telecommunication option 152 is provided when the first data 132 indicates match between eye-tracking data 122 of the first user 10 and reference eye-tracking data 124 and the second data 232 indicates a match between eye-tracking data 222 of the second user 20 and reference eye-tracking data 224, in other examples the recall can be presumed based on a response 912 of the first user 10 to the first content 112 (and likewise a response of the second user 20 to the second content 212). In such examples, rather than performing eye tracking, the telecommunication option 152 can be provided when both the first and second user 10, 20 exhibit a positive emotional response to the first and second content 112, 212 respectively.

Consequently, in some examples there is provided a method comprising:
- rendering first content 112 to the first user 10, the first content 112 being based on recorded content 322 associated with the second user 20;
- sensing the response 912 of the first user 10 to the first content 112;

determining first data 132 indicative of whether or not there is a match between the sensed response 912 of the first user 10 to the first content 112 and a positive emotional response;

receiving second data 232 indicative of whether or not there is a match between a sensed response of a second user 20 to second content 212, which is based on recorded content 352 associated with the first user 10, and a positive emotional response; and if both the first and second data 132, 232 are indicative of a match, then providing the first user 10 with a telecommunication option 152 configured to initiate communication with the second user 20.

Correspondingly, there may be provided a computer program that, when run on a computer, performs:

causing rendering of first content 112 to the first user 10, the first content 112 being based on recorded content 322 associated with the second user 20;

causing sensing of the response 912 of the first user 10 to the first content 112;

determining first data 132 indicative of whether or not there is a match between the sensed response 912 of the first user 10 to the first content 112 and a positive emotional response;

receiving second data 232 indicative of whether or not there is a match between a sensed response of a second user 20 to second content 212, which is based on recorded content 352 associated with the first user 10, and a positive emotional response; and if both the first and second data 132, 232 are indicative of a match, then causing the first user 10 to be provided with a telecommunication option 152 configured to initiate communication with the second user 20.

Correspondingly, there may be provided a first apparatus 1 comprising means for:

rendering first content 112 to the first user 10, the first content 112 being based on recorded content 322 associated with the second user 20;

sensing the response 912 of the first user 10 to the first content 112;

determining first data 132 indicative of whether or not there is a match between the sensed response 912 of the first user 10 to the first content 112 and a positive emotional response;

receiving second data 232 indicative of whether or not there is a match between a sensed response of a second user 20 to second content 212, which is based on recorded content 352 associated with the first user 10, and a positive emotional response; and if both the first and second data 132, 232 are indicative of a match, then providing the first user 10 with a telecommunication option 152 configured to initiate communication with the second user 20.

Since, as described in the foregoing, sensors not embodied in the first apparatus 1 such as wearable as well as non-wearable sensors can be used to sense the response 912 of the first user 10, the first apparatus 1 may form part of a first user-localized system comprising means for:

rendering first content 112 to the first user 10, the first content 112 being based on recorded content 322 associated with the second user 20;

sensing the response 912 of the first user 10 to the first content 112;

determining first data 132 indicative of whether or not there is a match between the sensed response 912 of the first user 10 to the first content 112 and a positive emotional response;

receiving second data 232 indicative of whether or not there is a match between a sensed response of a second user 20 to second content 212, which is based on recorded content 352 associated with the first user 10, and a positive emotional response; and if both the first and second data 132, 232 are indicative of a match, then providing the first user 10 with a telecommunication option 152 configured to initiate communication with the second user 20.

One or more functions or means for performing functions hereinbefore described can be performed or located remotely from the first apparatus 1. For example, as per FIGS. 2A to C, they may be performed or located at the second apparatus 2 or the remote device 3. Thus, it is to be appreciated that the method described in the foregoing may be implemented by a system which may involve a distributed network of devices.

Correspondingly, there may be provided a system comprising means for:

rendering first content 112 to the first user 10, the first content 112 being based on recorded content 322 associated with the second user 20;

rendering second content 212 to the second user 20, the second content 212 being based on recorded content 352 associated with the first user 10;

sensing the response 912 of the first user 10 to the first content 112;

sensing a response of the second user 20 to the second content 212;

determining first data 132 indicative of whether or not there is a match between the sensed response 912 of the first user 10 to the first content 112 and a positive emotional response;

determining second data 232 indicative of whether or not there is a match between the sensed response of the second user 20 to the second content 212 and a positive emotional response; and if both the first and second data 132, 232 are indicative of a match, then providing the first user 10 with a telecommunication option 152 configured to initiate communication with the second user 20.

In respect of the method, computer program, first apparatus 1, user-localized system, and the other aforementioned system in which the telecommunication option 152 is conditional on the users' emotional responses rather than eye tracking, embodiments may comprise the following various features:

Sensing the response 912 of the first user 10 to the first content 112 can comprise sensing one or more actions performed by the first user 10 in a time interval following the rendering of the first content 112.

A match with a positive emotional response can be determined by providing the sensed one or more actions as an input to an emotion recognition model that has been trained, through machine learning, to learn a mapping between actions and emotions.

The action performed by the first user 10 can comprise a user input to the first apparatus 1 in association with the first content 112.

The action performed by the first user 10 can comprise a movement of the first user 10.

The movement of the first user 10 can comprise a body movement.

The movement of the first user 10 can comprise one or more facial movements.

Facial movements can comprise one or more of, for example: eye movements; facial muscle movements; or head movements.

A match with a positive emotional response can be determined when the sensed response 912 of the first user 10 to the first content 112 comprises facial movements characteristic of happiness.

Sensing the response 912 of the first user 10 to the first content 112 can comprise physiological sensing in a time interval following the rendering of the first content 112.

Physiological sensing can comprise monitoring one or more of, for example: heart rate; breathing rate; or body temperature.

If the first data 132 is not indicative of a match and second data 232 is indicative of a match, then third content 812 can be rendered to the first user 10, the third content 812 being based on further recorded content associated with the second user 20.

The second user 20 can be selected from one or more stored social connections.

The recorded content 322 associated with the second user 20 can be the same as the recorded content 352 associated with the first user 10.

The recorded content 322 associated with the second user 20 can comprise a representation of the second user 20.

The second user 20 can be identified in metadata stored with or in association with the recorded content 322 associated with the second user 20.

The recorded content 322 associated with the second user 20 can comprise visual content.

There may be an established interaction history between the first user 10 and the recorded content 322 associated with the second user 20.

The first content 112 can comprise a first part of the recorded content 322 associated with the second user 20 and may not include a second part of the recorded content 322 associated with the second user 20.

The first content 112 can comprise user-generated content stored in association with the recorded content 322 associated with the second user 20.

The first content 112 can be rendered to the first user 10 in response to determining that a frequency of communication between the first and second users 10, 20 is below a threshold frequency.

The first content 112 can be rendered to the first user 10 in response to determining that a frequency of communication between the first and second users 10, 20 has decreased to below a threshold frequency.

The rendering of the first content 112 to the first user 10 can be conditional on a classification of a monitored behavior of the first user 10.

The first content 112 can be rendered to the first user 10 in response to receiving second data 232 which indicates a match between the sensed response of the second user 20 to the second content 212 and a positive emotional response.

Communication between the first user 10 and the second user 20 can be initiated upon actuation of the telecommunication option 152 by the first user 10.

The telecommunication option can comprise a control user interface configured to enable the first user 10 to compose a message and cause transmission of at least the composed message to the second user 20.

Where a structural feature has been described, it may be replaced by means for performing one or more of the functions of the structural feature whether that function or those functions are explicitly or implicitly described.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' in relation to an image relates to temporary recording of the data of the image. The use of the term 'store' in relation to an image relates to permanent recording of the data of the image.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The algorithms hereinbefore described may be applied to achieve the following technical effects: saving users' time resources and reducing users' stress.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems;

user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory including computer program code,
   the at least one memory and the computer program code configured to, with the at least one processor, cause the apparatus at least to:
      render first content to a first user, the first content being based on recorded content associated with a second user, wherein the second user is selected from a plurality of users and wherein the selection of the second user is based on there being associated at least one recorded content accessible to the apparatus, wherein the at least one recorded content comprises the first content;
      eye tracking in a time interval following the rendering of the first content to obtain eye-tracking data of the first user;
      determine first data indicative of whether or not there is a match between the eye-tracking data of the first user and reference eye-tracking data associated with the recorded content associated with the second user based upon a similarity measure between the eye-tracking data of the first user and the reference eye-tracking data associated with the recorded content exceeding a threshold;
      determine one or more content features based on one or more fixation durations at one or more fixation points at which the eye-tracking data of the first user matches the reference eye-tracking data associated with the recorded content associated with the second user;
      receive second data indicative of whether or not there is a match between eye-tracking data of the second user and reference eye-tracking data associated with recorded content associated with the first user;
      provide the first user with feedback based on the determined one or more content features and a telecommunication option configured to initiate communication with the second user, wherein provision of the telecommunication option is conditioned on both the first and second data being indicative of a respective match; and
      upon initiation of the telecommunication option, transmit a message auto-composed based upon the one or more content features to the second user via a telecommunication network.

2. The apparatus as claimed in claim 1 wherein the at least one memory and the computer program code configured to, with the at least one processor, cause the apparatus at least to render third content to the first user, the third content being based on further recorded content associated with the second user, wherein the rendering the third content is conditioned on the first data not being indicative of a match and second data being indicative of a match.

3. The apparatus as claimed in claim 1 wherein the recorded content associated with the second user is the same as the recorded content associated with the first user.

4. The apparatus as claimed in claim 1 wherein recorded content associated with the second user comprises visual content.

5. The apparatus as claimed in claim 1 wherein the first content is rendered to the first user in response to determining that a frequency of communication between the first and second users is below a threshold frequency.

6. The apparatus as claimed in claim 1 wherein the rendering of the first content to the first user is conditional on a classification of a monitored behavior of the first user.

7. The apparatus as claimed in claim 1 wherein the reference eye-tracking data associated with the recorded content associated with the second user is based on eye-tracking data recorded while the first user viewed the recorded content associated with the second user at an earlier time.

8. The apparatus as claimed in claim 1 wherein the reference eye-tracking data associated with the recorded content associated with the second user is based on eye-tracking data of the second user in respect of the recorded content associated with the second user.

9. The apparatus as claimed in claim 1 wherein the at least one memory and the computer program code are configured to, with the at least one processor, cause the apparatus at least to further perform: initiate communication between the first user and the second user upon actuation of the telecommunication option by the first user.

10. The apparatus as claimed in claim 1 wherein if the recorded content associated with the second user and the recorded content associated with the first user are the same, the at least one memory and the computer program code are configured to, with the at least one processor, cause the apparatus at least to further perform:
    compare the eye-tracking data of the first user with the eye-tracking data of the second user to determine the one or more fixation points at which the eye-tracking data of the first user matches the eye-tracking data of the second user;
    determine one or more content features based on the one or more fixation points at which the eye-tracking data of the first user matches the eye-tracking data of the second user; and
    provide the first user with feedback based on the determined one or more content features.

11. The apparatus as claimed in claim 1 wherein the at least one memory and the computer program code are configured to, with the at least one processor, cause the apparatus at least to further perform:
    determine a polarity of an emotional response of the first user to the first content based on analysis of facial movements and/or physiological parameters,
    wherein the provision of the telecommunication option is conditional on the polarity of the emotional response of the first user to the first content being positive.

12. A system comprising:
    at least one processor; and
    at least one memory including computer program code,
    the at least one memory and the computer program code configured to, with the at least one processor, cause the system at least to:
    render first content to a first user, the first content being based on recorded content associated with a second user, wherein the second user is selected from one or more of stored social connections of the first user;
    render second content to the second user, the second content being based on recorded content associated with the first user;
    eye tracking in a time interval following the rendering of the first content to obtain eye-tracking data of the first user;
    eye tracking in a time interval following the rendering of the second content to obtain eye-tracking data of the second user;
    determine first data indicative of whether or not there is a match between the eye-tracking data of the first user and reference eye-tracking data associated with the recorded content associated with the second user based upon a similarity measure between the eye-tracking data of the first user and the reference eye-tracking data associated with the recorded content exceeding a threshold;
    determine one or more content features based on one or more fixation durations at one or more fixation points at which the eye-tracking data of the first user matches the reference eye-tracking data associated with the recorded content associated with the second user;
    determine second data indicative of whether or not there is a match between the eye-tracking data of the second user and reference eye-tracking data associated with the recorded content associated with the first user;
    provide the first user with feedback based on the determined one or more content features and a telecommunication option configured to initiate communication with the second user, wherein provision of the telecommunication option is conditioned on both the first and second data being indicative of a respective match; and
    upon initiation of the telecommunication option, transmit a message auto-composed based upon the one or more content features to the second user via a telecommunication network.

13. The system as claimed in claim 12 wherein the at least one memory and the computer program code configured to, with the at least one processor, cause the system at least to render third content to the first user, the third content being based on further recorded content associated with the second user, wherein the rendering the third content is conditioned on the first data not being indicative of a match and second data being indicative of a match.

14. The system as claimed in claim 12 wherein the recorded content associated with the second user is the same as the recorded content associated with the first user.

15. The system as claimed in claim 12 wherein the recorded content associated with the second user comprises visual content.

16. A non-transitory computer readable medium comprising program instructions stored thereon for performing at least the following:
    causing rendering of first content to a first user, the first content being based on recorded content associated with a second user, wherein the first content comprises at least one image in which the second user is a subject;
    causing eye tracking in a time interval following the rendering of the first content to obtain eye-tracking data of the first user;
    determining first data indicative of whether or not there is a match between the eye-tracking data of the first user and reference eye-tracking data associated with the recorded content associated with the second user based upon a similarity measure between the eye-tracking data of the first user and the reference eye-tracking data associated with the recorded content exceeding a threshold;
    determine one or more content features based on one or more fixation durations at one or more fixation points at which the eye-tracking data of the first user matches the reference eye-tracking data associated with the recorded content associated with the second user;
    receiving second data indicative of whether or not there is a match between eye-tracking data of the second user and reference eye-tracking data associated with recorded content associated with the first user;
    causing the first user to be provided with feedback based on the determined one or more content features and a telecommunication option configured to initiate communication with the second user, wherein provision of the telecommunication option is conditioned on both the first and second data being indicative of a respective match; and
    upon initiation of the telecommunication option, transmit a message auto-composed based upon the one or more content features to the second user via a telecommunication network.

17. The non-transitory computer readable medium of claim 16, wherein the instructions are further for performing at least rendering third content to the first user, the third content being based on further recorded content associated with the second user, wherein the rendering the third content is conditioned on the first data not being indicative of a match and second data being indicative of a match.

18. The non-transitory computer readable medium of claim 16, wherein the recorded content associated with the second user is the same as the recorded content associated with the first user.

19. The non-transitory computer readable medium of claim 16, wherein recorded content associated with the second user comprises visual content.

* * * * *